United States Patent [19]

Hoffmann et al.

[11] Patent Number: 4,676,094
[45] Date of Patent: Jun. 30, 1987

[54] ROLL-FIRMNESS MEASURING DEVICE

[75] Inventors: Peter Hoffmann, Korschenbroich; Gerhard Buschmann, Düsseldorf; Hans Leichter, Neuss; Ewald Welp, Erkrath, all of Fed. Rep. of Germany

[73] Assignee: Jagenberg Aktiengesellschaft, Düsseldorf, Fed. Rep. of Germany

[21] Appl. No.: 853,359

[22] Filed: Apr. 17, 1986

[30] Foreign Application Priority Data

Apr. 18, 1985 [DE] Fed. Rep. of Germany ....... 3514041

[51] Int. Cl.$^4$ .................... G01N 3/40; G01N 21/86
[52] U.S. Cl. ........................................ 73/78; 73/159; 356/386; 356/429
[58] Field of Search ............... 73/78, 159; 356/384, 356/386, 429

[56] References Cited

U.S. PATENT DOCUMENTS 3,396,577  8/1968  Brackett ........................ 73/78 X
3,540,270  11/1970 Wolfer ........................... 73/78
3,628,376  12/1971 Dega et al. .................... 73/78 X
3,979,948  9/1976  George et al. ................. 73/78

FOREIGN PATENT DOCUMENTS 1495742  12/1977  United Kingdom .................. 73/78

Primary Examiner—Stewart J. Levy
Assistant Examiner—Tom Noland
Attorney, Agent, or Firm—Karl F. Ross; Herbert Dubno

[57] ABSTRACT

A measuring device for determining the pressure zone width and/or surface pressure between a web roll for a web and a further roll of a winding apparatus includes at least one reflex sensor emitting a radiation towards the web roll and receiving radiation reflected from the web roll. The reflex sensor is provided with a source emitting the radiation towards the web roll and a receiver which picks up beams reflected from the web roll. Source and receiver are embedded within the peripheral area of the further roll and are arranged adjacent to each other. During winding of the web, the reception of the radiation is interrupted when the web roll covers the source and/or the receiver. This interruption of the reception is a measure for the pressure zone width and in connection with other variables and constants for the roll firmness.

7 Claims, 3 Drawing Figures

ROLL-FIRMNESS MEASURING DEVICE

FIELD OF THE INVENTION

Our present invention refers to a measuring device for the firmness of a roll of web material and, more particularly, to a measuring device for this purpose which can determine the width of a pressure zone and/or the contact pressure between a roll of web material and a supporting roll or a pressure roll.

BACKGROUND OF THE INVENTION

The significance of the firmness of a roll of web material, especially paper, with respect to the quality of the wound-up web has long been recognized. Consequently, various methods have been proposed to determine the roll firmness.

A known method for evaluating the firmness of a finished roll uses test strips which are inserted within the roll at different radii thereof between selected turns with their ends projecting towards the exterior. The force required to pull out the strips is a measure of the roll firmness.

Although providing a determination of the roll firmness, this method does not allow control thereof during formation of the roll in order to allow possible corrective measures if the roll firmness deviates from a desired value.

It has therefore been proposed to determine the roll firmness during the roll formation, i.e. the winding operation, in dependence on a change of the density. This method, however, yields only average values of the roll firmness over the width of the roll. Local alterations of the roll firmness, e.g. because of fluctuations of the web profile or uneven or unequal roller loads cannot, however, be detected.

OBJECTS OF THE INVENTION

It is thus the principal object of our present invention to provide an improved measuring method especially for determining roll firmness, which is capable of obviating the afore-stated drawbacks.

Another object of this invention is to provide an improved method of determining the quality of a rolled web by detecting the firmness of the roll during winding, as a measure of the width of the pressure zone or the control pressure between the roll and a roller against which the roll bears or which bears upon the roll.

SUMMARY OF THE INVENTION

We realize this object in accordance with the present invention by providing at least one reflex sensor which emits radiation towards the web roll and picks up radiation reflected from the web roll. The reflex sensor includes a radiation source (emitter) and a radiation receiver (detector) which are provided, preferably in a single solid-state unit, side-by-side, embedded at the peripheral area of a supporting roller or pressure roller. A "reflex" sensor as this term is used here is one which responds to reflection of the sensing beam of energy by the web roll.

According to the invention, the web roll acts between source and receiver as a screen which reflects the radiation with sufficient intensity in the area close to the roll in order to be picked up by the receiver and to trigger an output signal. However in the contact area between the web roll and the supporting or pressure rollers no radiation is reflected so that no output signal is generated. The radiation receiver picks up a reflected signal only when the source is exposed again and the radiation is sufficiently reflected from the web roll. Thus, the time interval during which the web roll covers the reflex sensor so that no reflection occurs is a measure of the width of the entire contact area between the web roll and the supporting and/or pressure roller.

Preferably, the source emits, and the sensor detects, infrared radiation. I-R radiation is sufficiently different from ambient and local radiation to prevent the receiver from picking up interfering radiation from the environment.

According to another feature of the invention, the measuring device includes an evaluation unit which determines the pressure zone width of the web roll on the supporting roll or pressure roll by measuring the time interval between two successive signals, i.e. the phase during which the source is covered by the web roll so that no reflection is received, and by further considering a signal corresponding to the speed of the web.

In order to determine the roll firmness, the evaluation unit further considers the radius and weight of the web roll as well as further variable signals and constants such as web roll width, specific paper weight and geometry of the window apparatus.

With the measuring device according to the invention, the roll firmness can continuously be monitored and controlled during the formation of rolls which can thus be formed with optimum quality.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
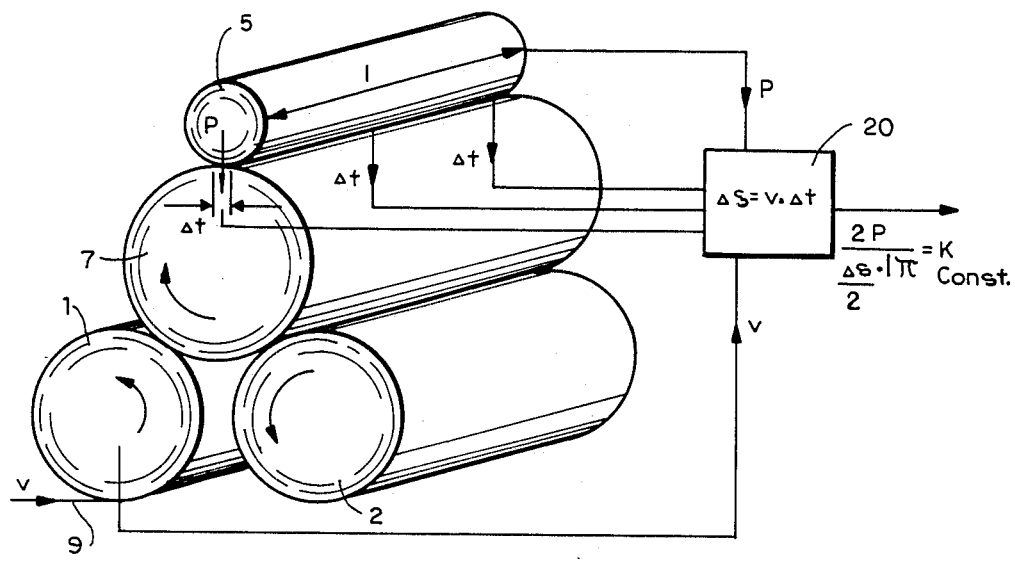
FIG. 1 is a perspective view diagrammatically showing a winding apparatus provided with a measuring device according to the invention for determining the width of the pressure zone.

FIG. 1 shows a winding apparatus including a pair of spaced supporting rollers 1, 2 cooperating with a web roll 7 which extends between, rests upon and contacts the supporting rollers 1, 2 which are rotated to wind up a web 9, e.g. of paper, which is advanced at a speed v equal to the peripheral speed of rollers 1, 2.

The web roll 7 has a length l and is pressed against the supporting rollers 1, 2 by a pressure roller 5 which extends along the apex of the web roll 7.

The roller 5 exerts upon the web roll 7 a pressure P which depends on the inherent weight of the roller 5 and an additional force with which the roller 5 is pressed against the web roll 7 and which is adjustable by suitable means (not shown).

Figure 3:
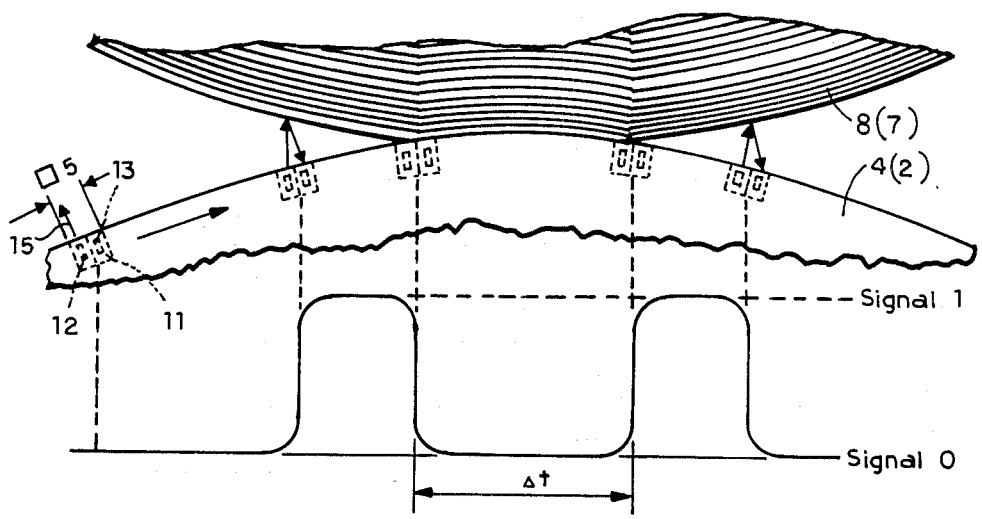
FIG. 3 is a schematic detail of the measuring device incorporated within the winding apparatus diagramming a measuring signal as generated by the measuring device according to the invention.

FIG. 3 shows a measuring device according to the invention for determining the pressure zone width in circumferential direction of the web roll 7 at the pressure roller 5 and or one or both of the supporting rollers 1, 2 as well as surface pressure and roll firmness as will be described in more detail in connection with FIG. 2.

Figure 2:
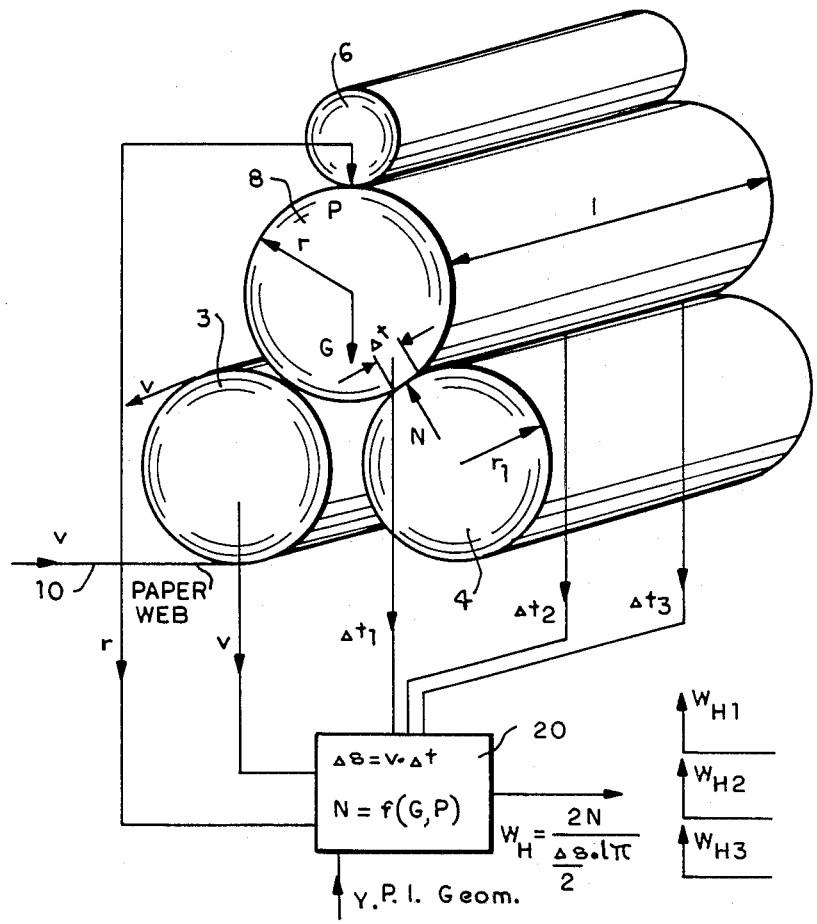
FIG. 2 is a similar view of the winding apparatus provided with a measuring device for determining the width of the pressure zone and the roll firmness.

The measuring device is explained with regard to the supporting roller 2 (and supporting roller 4 as illustrated in FIG. 2); however, it should be kept in mind that certainly the pressure roller 5 (and pressure roller 8 as illustrated in FIG. 2) can also or alternatively be equipped with corresponding measuring devices.

The measuring device includes at least one reflex sensor 11 which is embedded at the periphery of the supporting roller 2. If it is desired to determine the surface pressure at different locations, several such reflex sensors 11 are located at the periphery of the supporting roller 2 and pressure roller 5.

The sensor 11 is provided with a radiation source 12, preferably an infrared radiation source whose radiation is outwardly directed as indicated by arrow 15. Adjacent to the radiation source 12 and preferably forming a solid state unit therewith, the sensor 11 includes a radiation receiver 13 which picks up beams radiated from the source 12 and reflected at the surface of the web roll 7.

We may point out that the measuring device is provided in such a manner that beams radiated from the source 12 cannot directly be picked up by the receiver 13.

In FIG. 3, the sensor 11 is shown in five succeeding stages during rotation of the roller 2. When the sensor is in the position as shown at the left-hand side of FIG. 3, the beams radiated from the source 12 are not reflected so that the receiver 13 cannot pick up a signal. This stage is shown in FIG. 3 in a respective graph and designated by signal level 0. As soon as the sensor 11 approaches the surface of the web roll 7 through further rotation of the roller 2, as indicated by the next position of the sensor 11, the radiation is reflected along the surface of the roll 7 and picked up by the receiver 13 which delivers a signal designated by signal level 1 in FIG. 3. The signal level 1 is provided until the receiver 13 is covered by the web roll 7, at which time, again, no reflection is sensed and thus signal 1 is terminated.

After further rotation of the roller 2, the sensor 11 will reach the position at the right-hand side of FIG. 3 at which point the support roller 2 is not in contact with the web roll 7 so that the receiver 13 can pick up reflected beams, the delivering the signal level 1. The time interval between the successive deliveries of signal level 1 is indicated by $\Delta t$. As long as radiation is reflected from the web roll 7 with sufficient intensity, the receiver 13 will accordingly provide the signal level 1.

The time interval signal $\Delta t$ constitutes a measure of the pressure zone width in circumferential direction in accordance with the formula $\Delta s = v \cdot \Delta t$ wherein $v$ is the speed of the paper web 9 as advanced through the rollers. The signals corresponding to the time intervals $\Delta t$ and speed $v$ are transmitted to an evaluation unit 20 which determines the pressure zone width in dependence upon the transmitted signals. For maintaining the surface pressure at a constant level, a signal corresponding to the pressure P is transmitted to the evaluation unit 20 and controlled in correspondence with the formula $$\frac{2P}{\left(\frac{\Delta s}{2} \cdot l\pi\right)} = K, K \text{ a constant.}$$

FIG. 2 illustrates in greater detail the determination of the roll firmness. The winding apparatus is provided in the same manner as the winding apparatus of FIG. 1 and thus includes two spaced supporting rollers 3, 4 cooperating with a web roll 8 on which a pressure roller 6 exerts a suitable adjustable load at a pressure P. The obtained bearing force N at the rollers 3, 4 depends on the pressure P and the weight G of the web roll 8 which increases with increasing radius r of the web roll 8. In addition, the bearing force N depends on the geometric arrangement of the winding apparatus that is on the distance of the support rollers 3, 4, the radius $r_1$ of each rollers 3, 4 and on the radius r of the web roll 8. Signal transmitters which monitor the position of the bearing of the pressure roller 6 as well as the speed of one of the support rollers 3, 4 provide variable signals for the radius r of the web roll 8 and for the speed v of the fabric web 10 which signals are transmitted to the evaluation unit 20. A further signal transmitter delivers a signal for the pressure P of the pressure roller 6.

In this context, We should note that since the signals can be generated by known transducers such as load cells and that these are not the subject matter of the present invention, FIGS. 1 and 2 illustrate only signal lines connected to the evaluation unit and not the signal transmitters themselves although these lines are considered to represent such transducers.

After having determined the time interval $\Delta t$ in accordance with the measuring device as shown in FIG. 3 and calculating the pressure zone width according to the formula $\Delta s = v \cdot \Delta t$, the roll firmness $W_H$ can be determined by further considering the variables P, r and the constants for the length l of the web roll, the specific paper weight Y and the geometry of the winding apparatus according to the formula for the roll firmness $W_H = 2 \cdot N/(\Delta s/2 \cdot l \cdot \pi)$, wherein the bearing force N is a function of the weight G and the pressure $P(N = f(G,P))$. In the bearing force N, the paper weight Y and the geometry of the winding apparatus factors are constants.

The signal provided by the measuring device according to FIG. 1 for determination of the pressure zone width as well as the signal provided in accordance with FIG. 2 for determining the roll firmness are transmitted to respective control units. The signal for the pressure zone width is used to keep constant the surface pressure via the pressure force P while the actual value of the roll firmness $W_H$ is transmitted to the respective control unit and controlled by influencing the pressure force P.

We claim:

1. A measuring device for determining at least one of the roll parameters:
   (a) zone width, and
   (b) the surface pressure
   between a roll of a web and a further roller of a winding apparatus in contact with said roll, comprising:
   at least one reflex sensor emitting a radiation towards the web roll and receiving radiation reflected from the web roll; and
   an evaluation unit for determining the pressure zone width of the web roll with the roller in dependence on a time signal which corresponds to the time interval during which the reception of radiation is interrupted as said reflex sensor is covered by the web roll and on a speed signal corresponding to the speed of the web.

2. A measuring devices as defined in claim 1 wherein said reflex sensor includes a source emitting the radiation towards the web roll and a receiver picking up radiation reflected from the web roll.

3. A measuring device as defined in claim 2 wherein said source and said receiver are embedded within the peripheral area of said roller.

4. A measuring device as defined in claim 2 wherein said source and said receiver are disposed adjacent to each other.

5. A measuring device as defined in claim 2 wherein said source is an infrared radiation source.

6. A measuring device as defined in claim 1 wherein said evaluation unit further receives a signal for the web roll radius and a signal for the web roll weight for determining the roll firmness in consideration of further varying signals and constants such as web roll width, specific paper weight and geometry of the winding apparatus.

7. A winding apparatus for a web, comprising:
a pair of support rollers at least one of which is rotatable to coil a web into a roll upon said support rollers;
a pressure roller bearing upon said roll during the coiling of said web therein;
at least one reflex sensor received in a periphery of one of said rollers and including
an infrared radiation source generating a beam of radiation interceptable by said roll, and
an infrared radiation detector adjacent said source and responsive to said radiation upon its reflection from said roll, said sensor providing an output from which a duration of contact of said roll with said one of said rollers can be determined; and
computer means connected to said sensor for providing an output representing firmness of said roll as said roll is coiled on said support rollers.

* * * * *